United States Patent [19]

Hulyalkar et al.

[11] 3,997,629

[45] Dec. 14, 1976

[54] DYEABLE PROPYLENE POLYMER COMPOSITIONS

[75] Inventors: Ramchandra K. Hulyalkar, Oakland; Marvin Michael Fein, Westfield, both of N.J.; Jan Edmond Vandegaer, Pasadena, Md.

[73] Assignee: Dart Industries Inc., Los Angeles, Calif.

[22] Filed: Dec. 29, 1975

[21] Appl. No.: 644,657

[52] U.S. Cl. .............................. 260/897 B; 526/271
[51] Int. Cl.² ......................................... C08L 23/12
[58] Field of Search ................. 260/897 B; 526/271

[56] References Cited

UNITED STATES PATENTS

| | | | |
|---|---|---|---|
| 3,127,234 | 3/1964 | O'Neill | 8/115.5 |
| 3,265,675 | 8/1966 | Hagemeyer | 260/85.5 |
| 3,729,529 | 4/1973 | Andress | 260/897 B |
| 3,765,829 | 10/1973 | Lambert et al. | 260/897 B |

*Primary Examiner*—Carman J. Seccuro
*Attorney, Agent, or Firm*—Margareta Lemaire; Bryant W. Brennan; Fred S. Valles

[57] ABSTRACT

A propylene polymer composition having excellent affinity towards basic dyestuffs is produced by blending a propylene polymer with an alternating copolymer of an alkyl vinyl ether and maleic anhydride, the alkyl group of the alkyl vinyl ether containing at least 8 carbon atoms.

6 Claims, No Drawings

DYEABLE PROPYLENE POLYMER COMPOSITIONS

BACKGROUND OF THE INVENTION

Propylene polymers of relatively high crystallinity are notoriously difficult to dye and considerable research has been carried out for many years to improve the affinity of such polymers to dyestuffs. Generally, the dyeability has been improved by modifying the propylene polymer either by the mechanical addition of a dye receptive compound to the propylene polymer or by the chemical reaction of dye receptors with the propylene polymer yielding dye receptive sites.

Specifically, it has been suggested to mix maleic anhydride with propylene polymer to provide the composition with polar groups being receptive to basic dyes. A serious drawback, however, is that the maleic anhydride is not sufficiently compatible with the propylene polymer and hence produces non-uniform dye receptive sites.

It has also been suggested to graft the propylene polymer with maleic anhydride monomer. However, the grafting reaction is very difficult to carry out and results in a non-homogeneous product of inferior as well as varying mechanical properties, and which cannot be dyed evenly.

According to U.S. Pat. No. 3,765,829 the aforementioned difficulties are said to be overcome with a composition obtained by mixing a polyolefin such as polyethylene or polypropylene with a statistical copolymer of ethylene and maleic anhydride containing between 4 and 15 percent by weight of anhydride groups. The copolymers have a crystallinity and mechanical properties similar to those of ethylene homopolymers prepared by high pressure polymerization and are compatible with the polyolefin base resin provided that the copolymer contain no more than 15 percent by weight maleic anhydride groups. A drawback of using this copolymer with propylene polymer is that a relatively large proportion of the copolymer must be included in the mixture in order to incorporate sufficient maleic anhydride groups to obtain acceptable dyeability of the resultant composition, and this relatively large proportion has the effect of significantly affecting the physical properties of the composition as compared to the propylene polymer by itself.

It is therefore an object of the present invention to provide a propylene polymer composition which is receptive to basic dyes. It is another object of the invention to provide a dyeable propylene polymer composition which requires a lesser proportion of a maleic anhydride polymer than previously required in the prior art. Other objects of the invention will be apparent from the following description.

THE INVENTION

In accordance with the present invention there is provided a dyeable propylene polymer composition which comprises (a) a propylene polymer and (b) from about 0.1 to about 10 percent by weight of an alternating copolymer of maleic anhydride and an alkyl vinyl ether based on the combined weight of the propylene polymer and the alternating copolymer, wherein the alkyl group of the alkyl vinyl ether is one containing at least 8 carbon atoms. The number of carbon atoms in the alkyl group should for practical reasons not exceed 30, and most preferably the alkyl group should contain between 12 and 24 carbon atoms.

The mixture of components (a) and (b) should also contain between about 0.4 and about 2 percent by weight maleic anhydride groups derived from copolymer (b) and preferably this concentration should be maintained in the range of from about 0.5 to about 1.0 percent by weight.

The propylene polymer component of the composition of this invention is one of relatively high crystallinity and can be a propylene homopolymer as well as various copolymers of propylene and another alpha-olefin, such as ethylene, butylene and the like, or mixtures of homopolymer and copolymer. The copolymers can be random copolymers or block copolymers wherein the blocks themselves may either be homopolymers or random copolymers. Also, included in the definition of propylene polymer are various mixtures of propylene homopolymer and/or copolymer with a polymer of at least one other alpha-olefin such as ethylene. In general, the overall polymerized propylene content of the propylene polymer as defined should be at least 80%. All of the propylene polymers referred to above are well known in the art and need not be described in any further detail.

The alternating copolymers of alkyl vinyl ethers and maleic anhydride are also quite well known in the art and are easily produced employing free-radical initiated polymerization techniques, e.g. bulk or mass polymerization, solution polymerization etc.. Equimolar quantities of the alkyl vinyl ether and maleic anhydride are reacted in the presence of free-radical initiator, such as a peroxide, to yield the corresponding alternating copolymer containing alkyl vinyl ether and maleic anhydride in a 1:1 mole ratio. It was surprisingly found that alternating copolymers of alkyl vinyl ether and maleic anhydride, in spite of the structural dissimilarities of the copolymers as compared to propylene polymers, could be compatible with said propylene polymers provided that certain minimal restrictions were imposed on the number of carbon atoms in the alkyl group of the alkyl vinyl ether.

It is therefore an essential feature of this invention to restrict the alternating copolymers of alkyl vinyl ethers and maleic anhydride to those wherein the alkyl group of the alkyl vinyl ethers contains at least 8 carbon atoms per group. It was found that alternating copolymers derived from alkyl vinyl ethers having less than 8 carbon atoms in the alkyl group, are not as compatible with the propylene polymer as desired, and fibers and films produced from such compositions do not receive the dye in an even fashion, but appear mottled or spotty.

The composition of this invention can be compounded by any of the well known techniques, such as by blending in a Banbury mixer, by milling on a two roll mill or by melt extrusion and the like. Other additives may also be included, if desired, e.g. various stabilizers, flame retardants, lubricants, plasticizers, fillers, reinforcing fibers etc., without departing from the scope of the invention.

Fibers, films and other shaped articles made from the compositions of this invention, have a great affinity for basic type dyes, and receive the dyes in a homogeneous fashion. Also, the dyed articles have excellent color fastness with regards to laundering, dry cleaning and sunlight.

In order to provide a better understanding of the invention, reference is had to the following examples.

EXAMPLE 1

This example illustrates a technique for preparing the alkyl vinyl ether/maleic anhydride alternating copolymer component of the composition of this invention. 0.1 mol (10 grams) of maleic anhydride and 0.1 mol (26.2 grams) of cetyl vinyl ether were weighed into a 12 oz. reactor equipped with a magnetic stirrer. After addition of 0.5 weight percent (0.18 grams) benzoyl peroxide the reactor was purged with nitrogen and sealed. The reactor contents were gradually heated to 90° C under agitation, which was continued for 3 hours, when an incremental addition of 0.1 gram of benzoyl peroxide in 10cc of benzene was injected into the reactor, and the reaction was continued for another 5 hours at 90° C under agitation. The product was dried in a vacuum oven at 60° C, the yield was 36 grams.

Alternating copolymers of isobutyl vinyl ether, isoctyl vinyl ether and dodecyl vinyl ether with maleic anhydride were prepared using essentially the procedure described above except that no incremental benzoyl peroxide additions were made and the total hours of reaction were decreased to 5–6 hours.

The remaining alkyl vinyl ether/maleic anhydride copolymer used in the Examples below were obtained commercially from GAF Corporation (alkyl=methyl and octadecyl).

EXAMPLES 2–10

These examples demonstrate the criticality of using in the invention an alkyl vinyl ether/maleic anhydride copolymer containing at least 8 carbon atoms per alkyl group. The composition of each example was prepared by compounding isotactic propylene homopolymer with the specific copolymer and in the proportions indicated in Table I. The compounding was carried out using a Brabender mixer at 220° C for 3 minutes. Thin films were made from the compositions by compression molding at 210° C using contact pressure for 2 minutes followed by 250 psi for 2 minutes. The samples were cooled under pressure in a separate water-cooled press. The film samples were then immersed in aqueous solutions containing 0.1 wt. percent of a basic dye, (see Table I for identification) and the pH of the solution was adjusted to 8.5–10 by adding dilute ammonia. The temperature of the bath was gradually increased to 100° C in about ½ hours. The samples were occassionally stirred for an additional hour at 100° C, and thoroughly washed with water. The samples were then scoured for 15 minutes at 80° C with an aqueous solution containing 1 weight percent sodium carbonate and 0.5 weight percent of a detergent available from Rohm and Haas Co., under the tradename Triton-X-100, and washed with water. Subsequently, the samples were treated in sequence with methanol for 2–3 minutes at 60° C, with Stodard Solvent for 2–3 minutes at 60° C, and with perchloroethylene for 15 minutes at 60° C, after which they were finally washed with methanol and air dried.

The dyed films and fibers were then visually evaluated using the ratings poor, fair and good. A "poor" rating indicated a non-uniform appearance with significant amounts of clearly visible spots of lesser dye intensity. Samples were rated "fair" when considered not quite acceptable due to a slightly non-uniform appearance, while samples showing no flaws whatsoever were rated "good".

Table I below summarized the pertinent data from Examples 2–10.

TABLE I

| | Alkyl Vinyl Ether/Maleic Anhydride Copolymer Blends With Polypropylene | | | | | | | | |
|---|---|---|---|---|---|---|---|---|---|
| Examples | 2 | 3 | 4 | 5 | 6 | 7 | 8 | 9 | 10 |
| Composition | | | | | | | | | |
| Polypropylene - wt % | 99 | 98.4 | 98 | 98 | 97.5 | 97.0 | 96.5 | 98.0 | 96.0 |
| Alkyl Vinyl Ether/Maleic Anhydride - wt % | | | | | | | | | |
| methyl | 1 | 1.6 | 2 | — | — | — | — | — | — |
| isobutyl | — | — | — | 2 | — | — | — | — | — |
| isooctyl | — | — | — | — | 2.5 | — | — | — | — |
| dodecyl | — | — | — | — | — | 3.0 | — | — | — |
| cetyl | — | — | — | — | — | — | 3.5 | — | — |
| octadecyl | — | — | — | — | — | — | — | 2.0 | 4.0 |
| Maleic Anhydride groups - wt % in composition | 0.62 | 1.0 | 1.24 | 1.0 | 1.0 | 1.0 | 1.0 | 0.5 | 1.0 |
| Dyeability | | | | | | | | | |
| Verona Astrozon Blue[1] | Poor | — | Poor | Fair | Good | — | — | Good | Good |
| Rhodamine FB[2] | Poor | Poor | Poor | Fair | Good | Good | Good | Good | Good |
| Basacryl Orange FL.-Conc.[2] | — | Poor | Poor | — | — | — | — | Good | Good |

[1]Verona Dyestuffs
[2]BASF-Wyandotte Corp.

EXAMPLES 11–14

This set of experiments were made to assess more extensively the dye receptivity to various dyes of a polypropylene compounded with varying quantities of octadecyl vinyl ether/maleic anhydride copolymer using the procedure of the previous examples. Films were prepared as in Examples 2–10, fibers were also spun at 190° C into about 1.5 mil diameter using a CIL Rheometer and the standard orifice for determining melt index for resins. The films and fibers thus produced were dyed with various basic dyes, scoured and solvent treated using the procedures set forth in the previous examples. A summary of the pertinent data are presented in Table II.

TABLE II

| Octadecyl Vinyl Ether/Maleic Anhydride Copolymer Blends With Polypropylene | | | | |
|---|---|---|---|---|
| Examples | 11 | 12 | 13 | 14 |
| Composition | | | | |
| Polypropylene - wt % | 98.4 | 96.8 | 96.0 | 94.0 |
| $C_{18}$ Vinyl Ether/Maleic Anhydride - wt % | 1.6 | 3.2 | 4.0 | 6.0 |
| Maleic Anhydride groups | | | | |

TABLE II-continued

Octadecyl Vinyl Ether/Maleic Anhydride Copolymer Blends With Polypropylene

| Examples | 11 | 12 | 13 | 14 |
| --- | --- | --- | --- | --- |
| in composition - wt % | 0.4 | 0.8 | 1.0 | 1.5 |
| Dye Used | | | | |
| Rhodamine FB[1] | Good | Good | — | — |
| Verona Golden Yellow[2]- GL | Good | Good | Good | Good |
| Verona Astrozon Blue - 3RL[2] | Good | Good | Good | Good |
| Verona Astrozon Red BBL[2] | — | Good | — | — |
| Sevron Brilliant Red 49[3] | — | Poor | Good | Good |
| Calcozine Acrylic Yellow 3RN[4] | — | Good | — | — |
| Basacryl Red[1] | — | Good | — | — |
| Sevron Blue - B[3] | — | — | Good | Good |
| Basic Black OMB[5] | — | — | Good | — |
| Basic Black 414[5] | — | — | Good | — |
| Genacryl Black Extra Conc[5] | — | — | Good | — |

[1]BASF-Wyandotte Corp.
[2]Verona Dyestuffs
[3]E.I. DuPont de Nemours
[4]American Cyanamid
[5]GAF Corp.

As will be apparent many changes and variations may be made in practicing the invention without departing from the spirit thereof. Therefore, included in the scope of the appended claims are all modifications that will be obvious to those skilled in the art from the description and working examples given herein.

What is claimed is:

1. A dyeable propylene polymer composition comprising
   a. a propylene polymer and
   b. from about 0.1 to about 10 percent by weight of an alternating copolymer of an alkyl vinyl ether and maleic anhydride based on the combined weight of the propylene polymer and the alternating copolymer, wherein the alkyl group of the alkyl vinyl ether contains at least 8 carbon atoms, and the mixture of (a) and (b) contains from about 0.4 to about 2.0 percent by weight of maleic anhydride groups derived from the alternating copolymer.

2. A composition according to claim 1 wherein said alkyl group contains no more than 30 carbon atoms.

3. A composition according to claim 1 wherein said alkyl group contains between 12 and 24 carbon atoms.

4. A composition according to claim 1, wherein the mixture of (a) and (b) contains from about 0.5 to about 1 percent by weight of maleic anhydride groups derived from the alternating copolymer.

5. A composition according to claim 1, wherein the polymerized propylene content of the propylene polymer is at least 80 percent by weight.

6. A composition according to claim 1, wherein the propylene polymer is a propylene homopolymer.

* * * * *